US012273703B2

(12) United States Patent
Scheuregger

(10) Patent No.: US 12,273,703 B2

(45) Date of Patent: Apr. 8, 2025

(54) ADAPTIVE SPATIAL AUDIO PROCESSING

(71) Applicant: Bang & Olufsen A/S, Struer (DK)

(72) Inventor: Oliver Scheuregger, Valby (DK)

(73) Assignee: Bang & Olufsen A/S, Struer (DK)

( * ) Notice: Subject to any disclaimer, the term of this patent is extended or adjusted under 35 U.S.C. 154(b) by 226 days.

(21) Appl. No.: 18/066,875

(22) Filed: Dec. 15, 2022

(65) Prior Publication Data

US 2024/0205632 A1 Jun. 20, 2024

(51) Int. Cl.
*H04R 5/02* (2006.01)
*G10K 11/178* (2006.01)
*H04S 7/00* (2006.01)

(52) U.S. Cl.
CPC ........ *H04S 7/304* (2013.01); *G10K 11/17837* (2018.01); *H04S 2420/01* (2013.01)

(58) Field of Classification Search
CPC ............................ H04S 7/304; H04S 2420/01; G10K 11/17837
USPC .................................................. 381/310, 309
See application file for complete search history.

(56) References Cited

U.S. PATENT DOCUMENTS

| | | | | |
|---|---|---|---|---|
| 9,560,467 | B2 | 1/2017 | Gorzel et al. | |
| 10,034,092 | B1 | 7/2018 | Nawfal et al. | |
| 10,074,354 | B2 | 9/2018 | Gauger, Jr. et al. | |
| 10,757,529 | B2 | 8/2020 | Laitinen | |
| 2018/0249250 | A1* | 8/2018 | Pate | G06F 3/165 |
| 2022/0103964 | A1 | 3/2022 | Tu et al. | |

FOREIGN PATENT DOCUMENTS

| | | | |
|---|---|---|---|
| EP | 3668123 | A1 | 6/2020 |
| KR | 101880735 | B1 | 7/2018 |

OTHER PUBLICATIONS

Customize Transparency Mode for AirPods Pro—Apple Support (UK)—AirPods User Guide, viewed Jun. 29, 2022 <https://support.apple.com/en-gb/guide/airpods/dev966f5f818/web>.

What is Active Noise Cancellation? What is ANC—How Does Noise Cancellation Work? Bang & Olufsen 2022. Viewed Jun. 29, 2022 <https://www.bang-olufsen.com/da/dk/story/active-noise-cancellation>.

CNET—Transparency Mode Lets You Hear the World Around You When Using Noise Cancelling Headphones, viewed Jun. 29, 2022 <https://www.cnet.com/tech/mobile/headphone-transparency-mode/>.

Control Spatial Audio and Head Tracking—Apple Support (UK), 2022, viewed Jun. 29, 2022 https://support.apple.com/en-gb/guide/airpods/dev00eb7e0a3/web#:~:text=Fixed%3A%20Turns%20on%20Spatial%20Audio,the%20movement%20of%20your%20head <https://support.apple.com/en-gb/guide/airpods/dev00eb7e0a3/web>.

European Patent Office, Extended European Search Report for European Patent Application No. 23216642.1, dated Apr. 29, 2024.

* cited by examiner

*Primary Examiner* — Ammar T Hamid

(74) *Attorney, Agent, or Firm* — Patterson + Sheridan, LLP

(57) ABSTRACT

Techniques for performing spatial audio processing based on a listening mode of a wearable device are described. An example technique includes detecting a listening mode that is activated on the wearable device. A set of spatial audio processing settings is determined based on the listening mode. The set of spatial audio processing settings is applied to a spatial audio rendering algorithm while audio content is output from the wearable device. Another example technique includes detecting a listening mode of the wearable device that has been activated for listening to audio content. A head-tracking mode of the wearable device is controlled based on the listening mode.

20 Claims, 7 Drawing Sheets

ADAPTIVE SPATIAL AUDIO PROCESSING

BACKGROUND

The present disclosure generally relates to audio processing techniques, and more specifically, to techniques for performing spatial audio processing based in part on a listening mode of a wearable device.

Wearable devices (e.g., headphones, earphones, earbuds, etc.) generally include two electric-to-acoustic (also known as electroacoustic) transducers (e.g., one transducer for the left ear and another transducer for the right ear), and at least one microphone to capture external sound. The acoustic energy that is received at a user's ear canals from the wearable device and/or user's environment may be transmitted over different transmissions channels. A first transmission channel may include the user's digital media source, which generally transmits digital audio from a software application (e.g., music streaming application, video conferencing application, video streaming application, etc.) of a computing device (e.g., smartphone, laptop, tablet, etc.) to the wearable device. A second transmission channel generally includes external sound (e.g., sound from the user's physical environment), which is (i) captured by the microphone of the wearable device, (ii) processed by digital signal processing algorithms on the wearable device, and (iii) presented to the transducers. A third transmission channel includes external sound from the user's physical environment that passes through the wearable device but is not generated by the transducers.

A wearable device may support multiple listening modes for listening to audio, based on one or more transmission channels. For example, the listening modes can include passive listening mode, active noise cancellation listening mode, and a transparency listening mode. In passive listening mode, external sound (e.g., noise) from the user's environment may be reduced by the mechanical design of the wearable device. For example, wearable devices such as earbuds and closed-back headphones occlude the ear canal and pinna, respectively, but expose the transducer directly to the ear canal. In active noise cancellation listening mode, the wearable device may employ noise cancelling algorithms to dynamically analyze the signals captured by the microphone(s) of the wearable device and generate a cancellation signal that is presented to the user's ear canal via the transducers of the wearable device. In transparency listening mode, the wearable device may selectively filter certain external sounds (e.g., ambient noise) in the user's environment that is picked up by the microphone(s) of the wearable device. For example, the wearable device may digitally enhance certain sounds (e.g., speech), while still providing a level of noise cancellation for other sounds (e.g., ambient noise) in the user's environment.

Additionally, certain wearable devices may support spatial audio, allowing a user to perceive sound as emanating from certain locations in three-dimensional (3D) space. Wearable devices that support spatial audio may employ spatial audio rendering algorithms to place virtual audio sources arbitrarily in the user's environment. By arbitrarily placing virtual audio sources in the user's environment, wearable devices can simulate a virtual acoustic environment, in which sounds appear to be externalized from the user's head and can be localized in three dimensions.

In some cases, wearable devices may support spatial audio with head tracking. For example, certain wearable devices may include inertial measurement unit (IMU) sensors, which can measure a user's instantaneous head orientation in 3D (typically in terms of Heading, Pitch and Roll). Wearable devices may use this head orientation information to dynamically update a spatial audio rendering algorithm to give the impression that sounds remain fixed in space, relative to the external world.

However, while wearable devices may support various technologies for listening to audio, challenges still exist. Accordingly, it may be desirable to provide improved techniques for listening to audio via wearable devices.

SUMMARY

One embodiment described herein is a computer-implemented method for performing spatial audio processing based on a listening mode of a wearable device. The computer-implemented method includes detecting, at a first point in time and from a plurality of listening modes, a first listening mode that is activated at the first point in time on the wearable device. The computer-implemented method also includes determining a first set of spatial audio processing settings based on the first listening mode. The computer-implemented method further includes applying the first set of spatial audio processing settings to a spatial audio rendering algorithm while outputting audio content from the wearable device.

Another embodiment described herein is a computer-implemented method. The computer-implemented method includes detecting a listening mode of a wearable device that has been activated for listening to audio content. The computer-implemented method also includes controlling a head-tracking mode of the wearable device based on the listening mode.

Another embodiment described herein is a wearable device. The wearable device includes a processor and a memory. The memory stores instructions, which, when executed on the processor perform an operation for spatial audio processing based on a listening mode of the wearable device. The operation includes detecting, at a point in time and from a plurality of listening modes, a listening mode that is activated at the point in time on the wearable device. The operation also includes determining a set of spatial audio processing settings based on the listening mode. The operation further includes applying the set of spatial audio processing settings to a spatial audio rendering algorithm while outputting audio content.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
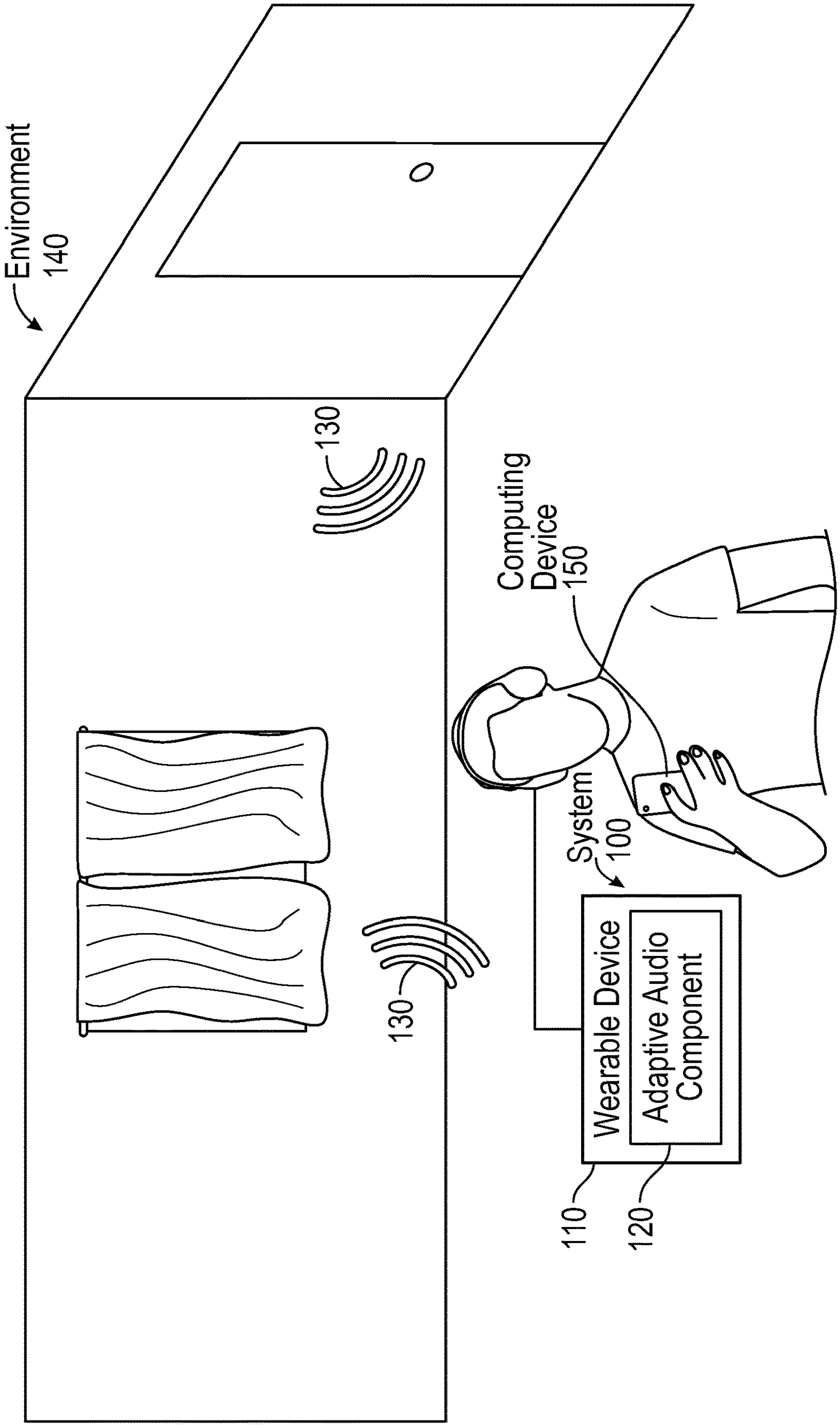
FIG. 1 illustrates an example system, according to one embodiment.

While many wearable devices support various technologies for listening to audio (e.g., active listening mode, passive listening mode, transparency listening mode, spatial audio, head-tracked spatial audio, etc.), wearable devices generally do not perform spatial audio processing based at least in part on a current listening mode of the wearable device. Assume, for example, that a user currently listening to music with spatial audio and active noise cancellation listening mode switches to listening to music with spatial audio and transparency listening mode. In such an example, the playback of the music with spatial audio in both the active noise cancellation listening mode and the transparency listening mode may remain the same in conventional wearable devices. That is, conventional wearable devices may not adapt the processing of spatial audio for the music playback when the user switches listening modes, e.g., from active noise cancellation listening mode to transparency listening mode, or vice versa.

Using the same spatial audio experience regardless of the current listening mode of the wearable device can significantly impact the user's listening experience. For example, implementing head-tracked spatial audio (e.g., head-tracked binaural audio) in the absence of a visual reference, as is the case with head-tracked binaural music, may feel disconcerting to the user. In another example, a user may activate transparency listening mode in order to maintain a degree of connectedness with the user's environment while consuming audio from the wearable device via a digital media source. In such an example, implementing head-tracked spatial audio with transparency listening mode activated may allow the user to retain contextual listening. However, when the user activates active noise cancellation listening mode, maintaining the head-tracked spatial audio can create confusion for the user and significantly degrade the user's listening experience. For example, the user may activate active noise cancellation listening mode in order to create a degree of privacy and isolation from the user's environment. As such, implementing head-tracked spatial audio when active noise cancellation listening mode is activated may result in a listening experience which is in conflict with the sense of privacy desired by the user, degrading the user's listening experience.

Because conventional wearable devices generally do not perform spatial audio processing based on the particular listening mode that is activated, users generally have to manually interact with the wearable device and/or listening parameters in order to create a desired listening experience. For example, a user may have to remove the wearable device in order to perceive certain ambient sounds in the user's environment, the user may have to interrupt the audio playback (e.g., pause or stop music playback) to manually adjust the spatial audio settings, the user may have to turn off spatial audio (e.g., deactivate binaural audio), and the like. Relying on the user to manually perform any one of or combination of such actions can degrade the user's listening experience.

Accordingly, embodiments described herein provide apparatus and techniques for performing spatial audio processing, based at least in part on a listening mode of a wearable device. Such listening modes can include, for example, a passive listening mode, an active noise cancellation listening mode, and a transparency listening mode. In certain embodiments described herein, a wearable device receives audio content via one or more sources. In one embodiment, the source(s) includes a digital media source, such as a software application running on the user's computing device. For example, the digital media source may transmit audio content from the user's computing device to the wearable device over a communication link (e.g., wireless communication link or wired communication link) between the wearable device and the user's computing device. In another embodiment, the source(s) includes an ambient environment in which the user is located. For example, microphone(s) of the wearable device may capture external sounds (e.g., ambient sounds, white noise, voice traffic) that are present in the user's environment. In yet another embodiment, the source(s) includes a combination of a digital media source and an ambient environment. For example, the wearable device may receive (i) first audio content (e.g., music) from a music streaming application on the user's computing device via a communication link between the wearable device and the user's computing device and (ii) second audio content (e.g., ambient sounds) from the user's environment via microphone(s) of the wearable device.

The wearable device can identify a listening mode that has been activated for listening to the audio content. For example, the user may activate a particular listening mode using the wearable device, a computing device communicatively coupled to the wearable device, or a combination thereof. In certain embodiments, the wearable device dynamically determines a set of spatial audio processing settings, based on the activated listening mode, and applies the set of spatial audio processing settings during playback of the audio content via the wearable device.

In this manner, embodiments described herein enable the wearable device to dynamically apply different spatial audio processing settings, based on the current listening mode being used to listen to audio via the wearable device. For example, when active noise cancellation listening mode is activated, the wearable device may dynamically adjust one or more spatial audio processing settings, such that the user experiences a degree of privacy and isolation from the external world. Additionally or alternatively, the wearable device may disable or deactivate head-tracking mode when the active noise cancellation listening mode is activated. Similarly, when transparency listening mode is activated, the wearable device may dynamically adjust one or more spatial audio processing settings to allow the user to listen to digital audio as well as ambient sounds within the user's environment. Additionally or alternatively, the wearable device may enable or activate head-tracking mode when the transparency listening mode is activated.

In certain embodiments, the wearable device may dynamically adjust the spatial audio processing setting(s) based on one or more current acoustic properties of the user's environment. For example, the wearable device may detect one or more signals within the user's environment via the microphone(s) of the wearable device and determine one or more acoustic properties of the user's environment, based on analysis of the one or more signals. A reference example of an acoustic property of an environment is reverberation time, which is a measure of the time that it takes for sound to fade away in an environment after the source of the sound has stopped. One example metric of reverberation time is reverberation time 60 (RT60). RT60 is generally the measure of the amount of time, after a sound source ceases, that it takes for the sound pressure level to reduce by 60 dB. The RT60 of a given environment may be indicative of at least one of the type of environment (e.g., outdoors, concert hall, office, classroom, or living room), a size of the environment, or total absorption of the environment. Another reference example of an acoustic property of an environment is an absorption coefficient(s), which is a numerical value between 0 and 1 that indicates the proportion of sound which is absorbed by a surface of a material in the environment compared to the proportion which is reflected back to the environment. An absorption coefficient of “1” may indicate that an environment includes a material that does not reflect any sound (e.g., a fully open window), whereas an absorption coefficient of “0” may indicate that an environment includes a material that fully reflects sound (e.g., a painted concrete ceiling).

As described below, the wearable device may apply the acoustic properties determined for a given environment to a spatial audio rendering algorithm to dynamically adjust the spatial audio processing setting(s) used for spatial audio processing. For example, as part of adjusting the spatial audio processing settings, the wearable device may (i) automatically lower a volume of the digital media content and/or (ii) automatically adjust an amount of virtual acoustic parameters used for spatial audio processing, when transparency listening mode is activated to create contrast with the listening environment created when active noise cancellation listening mode is activated.

FIG. 1 illustrates an example system 100 for performing spatial audio processing based in part on a listening mode of the wearable device, according to one embodiment. A user may use the system 100 within an environment 140, examples of which can include a workplace, residence, public facility, etc. The system 100 includes a wearable device 110 and a computing device 150. The wearable device 110 may be communicatively coupled to the computing device 150 via a wireless communication link (e.g., Bluetooth communication link or another wireless protocol) or a wired communication link (e.g., via a headphone cable). The user may use the wearable device 110 to listen to audio content (e.g., music, audio podcast, video content, etc.) from the computing device 150. Note that while FIG. 1 illustrates the wearable device 110 as separate from the computing device 150, in certain embodiments, the computing device 150 is integral with wearable device 110.

The wearable device 110 may support multiple listening modes for listening to audio content, including, for example, active noise cancellation listening mode, transparency listening mode, and passive listening mode. In addition to supporting multiple listening modes, the wearable device 110 may support spatial audio, which allows users to perceive sound as emanating from certain locations in 3D space. The wearable device 110 may support spatial audio with head-tracking or may support spatial audio without head-tracking.

As shown, the wearable device 110 includes an adaptive audio component 120, which is configured to implement one or more techniques described herein for performing spatial audio processing based in part on a listening mode being used to listen to audio content from the computing device 150. In an exemplary scenario, the user may initially listen to audio content from the computing device 150 using an active noise cancellation listening mode of the wearable device 110. In such a scenario, the user may activate active noise cancellation listening mode in order to create a degree of privacy and isolation from the environment 140, which may be a noisy environment with external sounds 130 (e.g., noisy workplace, public facility). In such an example, the adaptive audio component 120 may determine one or more (first) spatial audio processing settings based at least in part on the activated active noise cancellation listening mode and apply the (first) spatial audio processing settings during playback of the audio content.

Continuing with the above example, at a subsequent point in time, the user may listen to audio content from the computing device using a transparency listening mode of the wearable device 110. For example, the user may activate the transparency listening mode in order to perceive at least some of the external sounds 130 (e.g., other users’ voices, street traffic, outdoor nature sounds, or loudspeaker announcements in a public facility, such as an airport, subway, etc.) while still listening to audio content from the wearable device 110. In such an example, the adaptive audio component 120 may determine one or more (second) spatial audio processing settings based at least in part on the activated transparency listening mode and apply the (second) spatial audio processing settings during playback of the audio content. In this manner, as the user switches from active noise cancellation listening mode to transparency listening mode, or vice versa, the adaptive audio component 120 can dynamically adjust the spatial audio processing settings for spatial audio based on the particular listening mode of the wearable device that is currently activated.

In certain embodiments, the adaptive audio component 120 may dynamically adjust the spatial audio processing settings based on the currently activated listening mode of the wearable device by activating or deactivating head-tracking mode. For example, the adaptive audio component 120 may deactivate head-tracking mode when active noise cancellation listening mode is activated. In another example, the adaptive audio component 120 may activate head-tracking mode when transparency listening mode is activated. By dynamically activating or deactivating head-tracking mode based on the currently activated listening mode of the wearable device, the adaptive audio component 120 can significantly enhance the user’s listening experience by preventing head-tracked spatial audio from being used when active noise cancellation listening mode is activated.

In certain embodiments, in addition to or as alternative to performing spatial audio processing based on the listening mode of the wearable device 110 that is currently activated, the adaptive audio component 120 can perform spatial audio processing based on one or more acoustic properties in the environment 140. For example, the adaptive audio component 120 may monitor the external sounds 130 within the environment 140 (e.g., using a microphone(s) of the wearable device 110) and evaluate the external sounds 130 using one or more algorithms to determine one or more acoustic parameters of the environment 140. The algorithm(s) may include artificial intelligence/machine learning based algorithms, rule-based algorithms, or combinations thereof. The adaptive audio component 120 may monitor the external sounds 130 on a continual basis, on a periodic basis (e.g., every 5 minutes), or in response to a predefined event (e.g., detecting a change in position and/or orientation of the user, a command from the user, a particular type or category of sound, etc.). In this manner, the adaptive audio component 120 can dynamically update the spatial audio processing settings to maintain a user’s desired listening experience when listening to audio content from the computing device 150.

In one non-limiting example, the adaptive audio component 120 may determine, based on the reverberation time at a first time instance, that the user is located in an indoor environment, and may use a first set of virtual acoustic settings associated with indoor environments for spatial audio processing. Subsequently, the adaptive audio component 120 may determine, based on the reverberation time at a subsequent second time instance, that the user is located in an office environment, and may use a second set of virtual acoustic settings associated with office environments for spatial audio processing.

In certain embodiments, the adaptive audio component 120 may dynamically adjust the spatial audio processing settings by adjusting one or more audio playback settings, based on the currently activated listening mode of the wearable device 110. In such embodiments, for example, upon detecting a change from active noise cancellation listening mode to transparency listening mode, the adaptive audio component 120 may automatically reduce a volume level of the audio content from the computing device 150. By automatically reducing the volume level when the transparency listening mode is activated, the adaptive audio component 120 can increase the user's perception of certain external sounds 130 within the environment 140.

In one non-limiting example, the user may activate active noise cancellation listening mode when the user is in a noisy environment (e.g., grocery store) to create a degree of privacy in the noisy environment. In some instances, however, the user may switch from active noise cancellation listening mode to transparency listening mode when the user is in the presence of another user in the noisy environment and wishes to hear the other user's voice in the noisy environment. When the user switches to transparency listening mode, the adaptive audio component 120 may automatically reduce the volume level of the audio content to allow the user to hear the other user's voice in the noisy environment. As such, the adaptive audio component 120 may allow the user to more easily hear the other user while the user is still listening to the audio content.

Similarly, in another example, upon detecting a change from transparency listening mode to active noise cancellation listening mode, the adaptive audio component 120 may automatically increase a volume level of the audio content from the computing device 150. In one embodiment, the adaptive audio component 120 may return the volume level back to a predefined volume level or to a previous volume level setting used prior to a change from transparency listening mode to active noise cancellation listening mode.

In yet another example, when the user switches to transparency listening mode in a noisy environment, the adaptive audio component 120 may adjust the virtual sound source emphasis to allow the user to perceive other sounds (e.g., other users' voices) in the noisy environment. As part of adjusting the virtual sound source emphasis, the adaptive audio component 120 may emphasize speech signals while attenuating diffuse ambient sounds in order to allow the user to more easily hear other users' voices in the noisy environment. Note that the above examples are provided as reference scenarios in which the audio playback settings may be automatically adjusted based on the activated listening mode and that the above techniques for automatically adjusting audio playback settings may be applied in other scenarios consistent with the functionality described herein.

Note that while FIG. 1 describes the system 100 being used within an indoor environment, the system 100 as well as the techniques described herein for performing spatial audio processing based on a listening mode of a wearable device can be implemented in outdoor environments (e.g., park, city street, neighborhood). Further, note that while FIG. 1 depicts the adaptive audio component 120 being implemented on the wearable device 110, in other embodiments, the adaptive audio component 120 may be implemented on another device, such as the computing device 150. In such embodiments, the wearable device 110 can send sensor data from one or more sensors (e.g., accelerometers, gyroscopes, and magnetometers) of the wearable device 110 to the computing device 150. The computing device 150 may use the sensor data to perform spatial audio processing (via the adaptive audio component 120) on behalf of the wearable device 110, and send spatialized audio (e.g., a spatialized 2-channel signal or binaural audio signal) to the wearable device 110 for playback to the user. In a non-limiting example, assume the wearable device 110 is over-ear headphones, which hosts an inertial measurement unit (IMU), and the computing device 150 is a smartphone, which hosts the adaptive audio component 120. In this example, the over-ear headphones may send IMU data to the smartphone over a wireless communication link (e.g., Bluetooth communication link) or wired communication link (e.g., headphone cable). The smartphone may process the IMU data with the adaptive audio component 120 and output a set of spatialized audio, such as a binaural audio signal. The smartphone may send the binaural audio signal to the over-ear headphones over the wireless communication link or wired communication link, and the over-ear headphones may output the binaural audio signal to the user's ear canals via two transducers (e.g., one transducer for the left ear and another transducer for the right ear).

Figure 2:
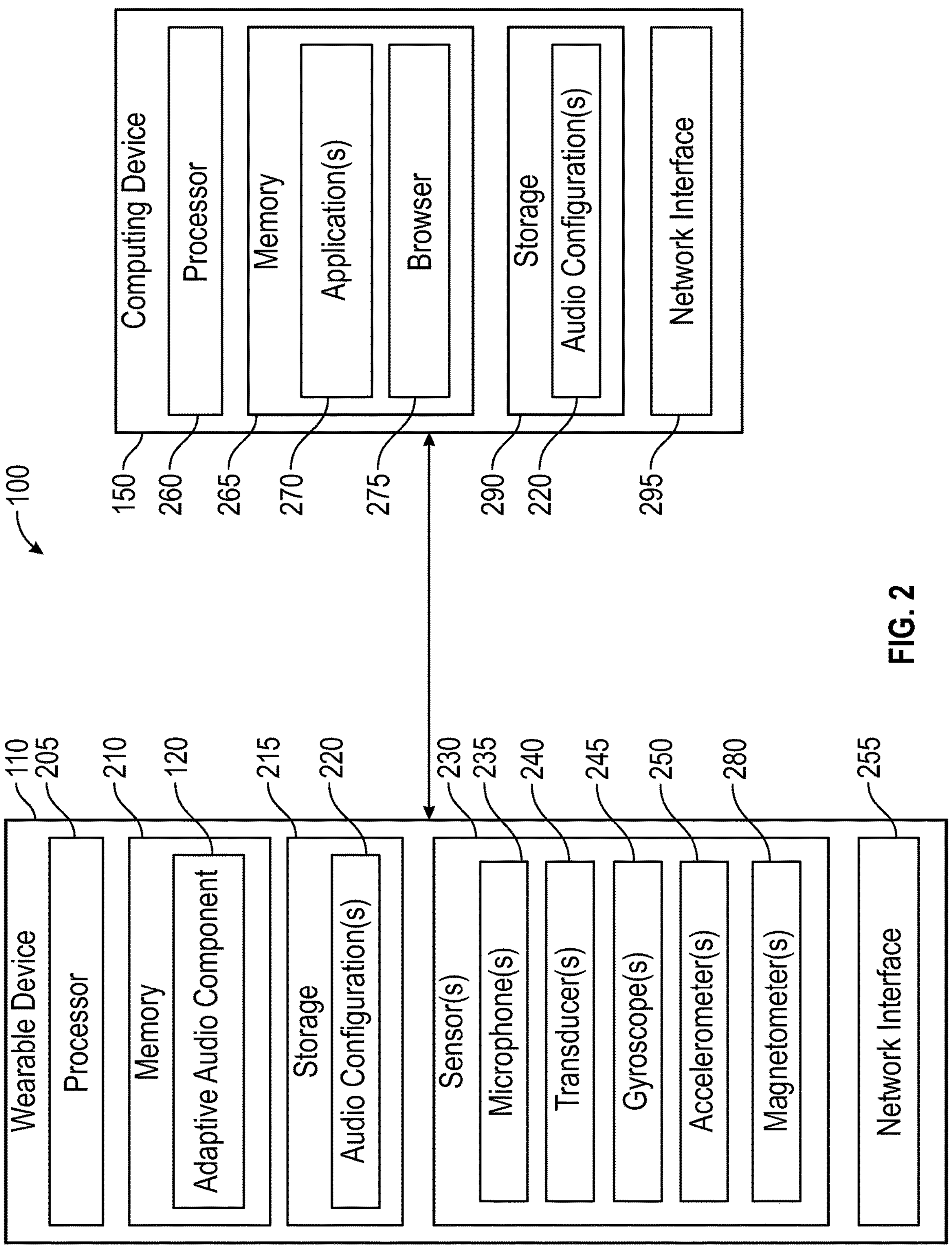
FIG. 2 further illustrates certain components of the system in FIG. 1, according to one embodiment.

FIG. 2 further illustrates certain components of the system 100 described relative to FIG. 1, according to one embodiment. As shown, the system 100 includes the wearable device 110 and computing device 150. The wearable device 110 is representative of a variety of wearable devices including, but not limited to, earbuds, earphones, over-ear headphones, on-ear headphones, closed-back headphones, open-back headphones, etc. The computing device 150 is representative of a variety of computing devices including, but not limited to, smartphones, tablet, a laptop computer, gaming console, smartwatch, smart television, etc. Note that while FIG. 2 illustrates the wearable device 110 as separate from the computing device 150, in certain embodiments, the computing device 150 is integral with wearable device 110.

Here, the computing device 150 includes a processor 260, a memory 265, a browser 275, a storage 290, and a network interface 295. The processor 260 represents any number of processing elements, which can include any number of processing cores. The memory 265 can include volatile memory, non-volatile memory, and combinations thereof.

The memory 265 generally includes program code for performing various functions related to applications (e.g., applications 270 and/or browser(s) 275) hosted on the computing device 150. The program code is generally described as various functional "applications" or "modules" within the memory 265, although alternate implementations may have different functions or combinations of functions. Here, the memory 265 includes a browser 275 and an application(s) 270. In certain embodiments, the application(s) 270 and/or browser 275 are used to access audio content on the computing device 150 and/or another computing system (e.g., via a network, such as the Internet). For example, the application(s) 270 may include a music streaming application, a video conferencing application, a video streaming application, etc.

The storage 290 may be a disk drive storage device. Although shown as a single unit, the storage 290 may be a combination of fixed and/or removable storage devices, such as fixed disc drives, removable memory cards, or optical storage, network attached storage (NAS), or a storage area-network (SAN). In certain embodiments, the storage 290 includes one or more audio configurations 220. Each audio configuration 220 may include a predefined set of audio settings, which may be applied to playback of audio content from the computing device 150. In some embodiments, each audio configuration 220 is associated with a different listening mode supported by the wearable device 110. For example, a first one or more audio configurations 220 may be used when an active noise cancellation listening mode of the wearable device 110 is activated; a second one or more audio configurations 220 may be used when a transparency listening mode of the wearable device 110 is activated; and a third one or more audio configurations 220 may be used when a passive listening mode of the wearable device 110 is activated. In general, the audio configuration(s) 220 may include audio settings for any listening mode (now known or later developed) of the wearable device 110. The audio configuration(s) 220 may be obtained from a user of the computing device 150, obtained from a developer of the application(s) 270, or combinations thereof.

The network interface 295 may be any type of wired or wireless network communications interface that allows the computing device 150 to communicate with other computers and/or components in the system 100 (e.g., wearable device 110) via a data communications network. In one particular embodiment, the network interface 295 is a Bluetooth communications interface that allows the computing device 150 to wirelessly communicate with the wearable device 110 over a Bluetooth communication link. In another embodiment, the network interface 295 is a wired communications interface, such as a headphone cable.

The wearable device 110 includes a processor 205, a memory 210, a storage 215, one or more sensors 230, and a network interface 255. The processor 205 represents any number of processing elements, which can include any number of processing cores. The memory 210 can include volatile memory, non-volatile memory, and combinations thereof.

The memory 210 generally includes program code for performing various functions related to applications (e.g., adaptive audio component 120) hosted on the wearable device 110. The program code is generally described as various functional "applications" or "modules" within the memory 210, although alternate implementations may have different functions or combinations of functions. Here, the memory 210 includes the adaptive audio component 120, which may include software, hardware, or combinations thereof. The adaptive audio component 120 may use a spatial audio rendering algorithm to generate spatial audio effects for the user. Examples of spatial audio rendering algorithms include, but are not limited to, Fraunhofer Institute for Integrated Circuits (IIS) CINGO®, Dolby® sound virtualizer, IDUN audio, RealSpace® 3D Spatial Audio, Resonance Audio, and Sympan Audio. The spatial audio rendering algorithm(s) may provide application programming interface(s) (API(s)) that allow for controlling one or more parameters of the spatial audio rendering. For example, the spatial audio rendering algorithm(s) may provide APIs that control parameters, such as a degree/type of acoustic environment (e.g., a reverb setting), a positioning of virtual sound sources, and head-tracking support.

In certain embodiments described herein, the adaptive audio component 120 is configured to perform spatial audio processing based on a listening mode of the wearable device 110. For example, the adaptive audio component 120 may receive audio content from the computing device 150 and may perform spatial audio processing of the audio content, based at least in part on a listening mode of the wearable device 110 that is currently activated. Note, the adaptive audio component 120 is described in greater detail below.

Although shown as a single unit, the storage 215 may be a combination of fixed and/or removable storage devices, such as fixed disc drives, removable memory cards, or optical storage, network attached storage (NAS), or a storage area-network (SAN). In certain embodiments, the storage 215 includes one or more audio configurations 220. The network interface 255 may be any type of network communications interface that allows the wearable device 110 to communicate with other computers and/or components in the system 100 (e.g., computing device 150) via a data communications network. In one particular embodiment, the network interface 255 is a Bluetooth communications interface that allows the wearable device 110 to wirelessly communicate with the computing device 150 over a Bluetooth communication link.

The sensor(s) 230 generally includes one or more sensors that are configured to sense information from the physical environment, such as environment 140 depicted in FIG. 1. In this embodiment, the sensors 230 include one or more microphones 235, one or more transducers 240, one or more gyroscopes 245, one or more accelerometers 250, and one or more magnetometer(s) 280. The microphone(s) 235 is generally a transducer that converts sound into an electrical signal. Here, for example, the microphone(s) 235 can capture external sound (e.g., external sounds 130), convert the external sound into electrical signals, and provide the electrical signals to the adaptive audio component 120 for processing. In one embodiment, the wearable device 110 includes multiple microphones 235 (e.g., one microphone 235 for the portion of the wearable device 110 used for the left ear of a listener and another microphone 235 for the portion of the wearable device 110 used for the right ear of the listener). In another embodiment, the wearable device 110 may include a single microphone 235.

The transducer(s) 240 are generally electroacoustic transducers that convert electrical signals to acoustic signals. For example, a transducer 240 may receive an electrical signal(s) from the adaptive audio component 120 and/or the computing device 150 (via network interface 255), may convert the electrical signal(s) into acoustic signals, and may output or provide the acoustic signals to a listener's ear canals. In one embodiment, a wearable device 110 includes multiple transducers 240 (e.g., one transducer 240 for the user's left ear and another transducer 240 for the user's right ear).

The gyroscope(s) 245 measures orientation of the wearable device 110, and provides information as to whether the wearable device 110 is titled in one or more planes. The accelerometer(s) 250 measures acceleration forces acting on the wearable device 110 and may provide information as to whether the wearable device 110 is moving, and in which direction(s). The magnetometer(s) 280 measures the strength and direction of a magnetic field surrounding the wearable device 110. In certain embodiments, the accelerometer(s) 250, gyroscope(s) 245, and/or magnetometer(s) 280 are included within an IMU of the wearable device 110. In one embodiment, the combination of the accelerometer(s) 250, gyroscope(s) 245, and/or magnetometer(s) 280 may provide information of a direction sense for the wearable device 110 in terms of pitch and roll with respect to gravity. For example, as noted, certain wearable devices that support head-tracking may utilize information from the accelerometer(s) 250, gyroscope(s) 245, and/or magnetometer(s) 280 to determine a user's head orientation information in 3D and dynamically update a spatial audio rendering algorithm based on the head orientation information.

Note the wearable device 110 and computing device 150 depicted in FIG. 2 are reference examples of a wearable device and computing device that may be used to implement one or more techniques described herein for performing spatial audio processing based on a listening mode of a wearable device. In other embodiments, the wearable device 110 and/or computing device 150 may have a different configuration (e.g., different set of software components/hardware components) for performing spatial audio processing based on a listening mode of a wearable device, consistent with the functionality described herein. For example, as noted, while FIG. 2 depicts the wearable device 110 as separate from the computing device 150, in other embodiments, the computing device 150 is integral with the wearable device 110.

Similarly, while FIG. 2 depicts the adaptive audio component 120 being implemented by the wearable device 110, in other embodiments, the adaptive audio component 120 may be implemented at the computing device 150. In such embodiments, the wearable device 110 may capture external sounds via the microphones 235 and send electrical signals associated with the external sounds to the adaptive audio component (at the computing device 150) for processing. The computing device 150 may then send electrical signals to the wearable device 110, which can convert the electrical signals to acoustic signals via the transducers 240, which can present the acoustic signals to the user's ear canals. In a particular embodiment, to enable spatial audio, the wearable device 110 may send IMU data (e.g., sensor data from the accelerometer(s) 250, gyroscope(s) 245, and/or magnetometer(s) 280) to the adaptive audio component (at the computing device 150). The adaptive audio component may perform spatial audio processing at the computing device 150 using the IMU data received from the wearable device 110, and send (e.g., stream) spatialized audio back to the wearable device 110 via the network interface 295.

Figure 3:
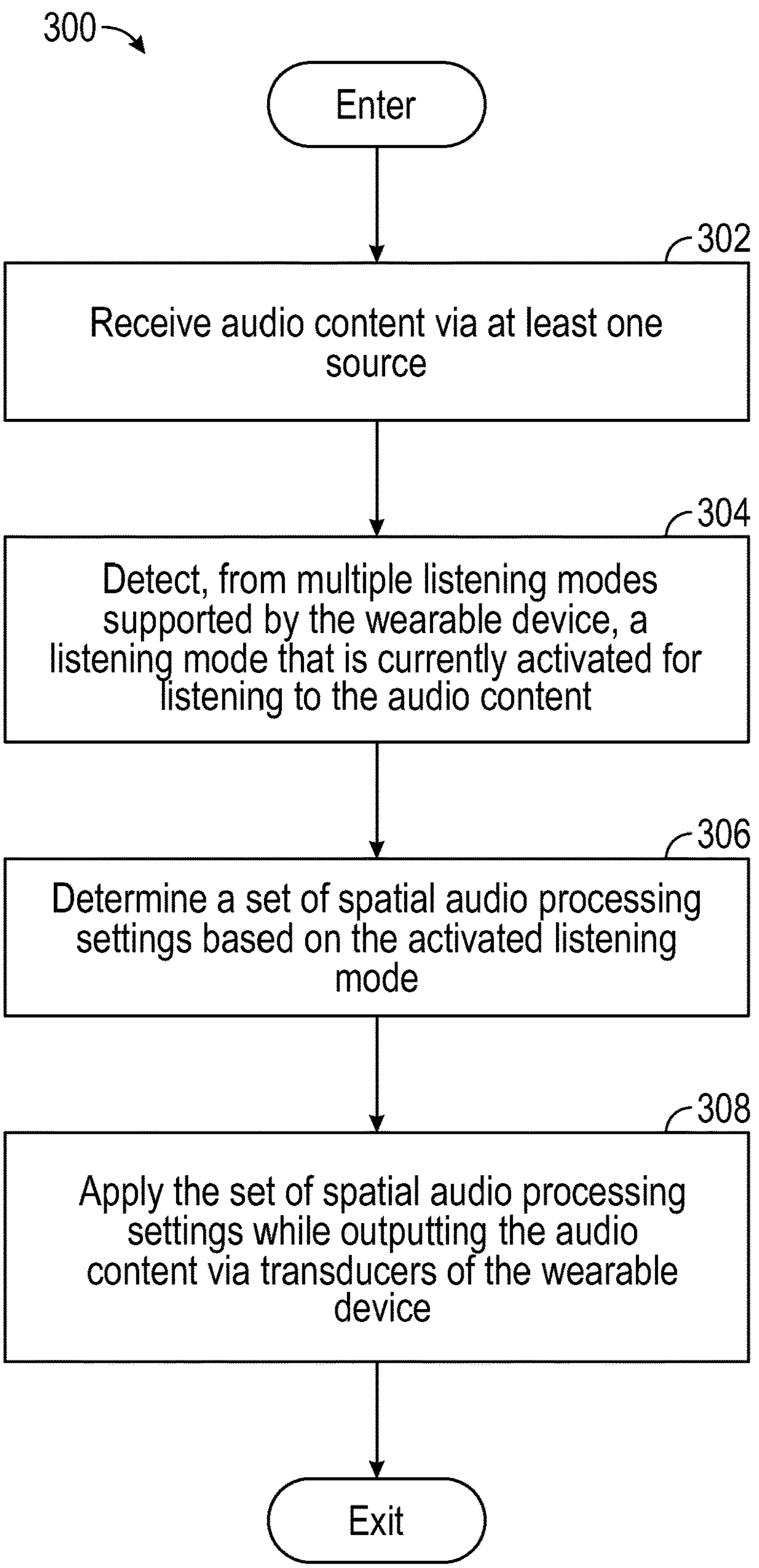
FIG. 3 is a flowchart of a method for performing spatial audio processing based on a listening mode of a wearable device, according to one embodiment.

FIG. 3 is a flowchart of a method 300 for performing spatial audio processing based on a listening mode of a wearable device. The method 300 may be performed by a wearable device (e.g., wearable device 110). For example, at least some of the method 300 may be performed by an adaptive audio component (e.g., adaptive audio component 120) of the wearable device.

Method 300 may enter at block 302, where the wearable device receives audio content via at least one source. The at least one source can include, for example, a computing device (e.g., computing device 150) or an environment (e.g., indoor environment, such as environment 140, or an outdoor environment) in which the wearable device is located.

At block 304, the wearable device detects, from multiple listening modes supported by the wearable device, a listening mode that is currently activated for listening to the audio content. As noted, the listening modes supported by the wearable device can include an active noise cancellation listening mode, a transparency listening mode, a passive listening mode, etc. A user may activate a particular listening mode via the computing device (e.g., computing device 150) and/or via the wearable device 110 (e.g., the wearable device 110 may include one or more input devices that allow the user to change listening modes of the wearable device 110).

At block 306, the wearable device dynamically determines a set of spatial audio processing settings, based on the activated listening mode. For example, the wearable device may select a particular set of spatial audio processing settings associated with an active noise cancellation listening mode when the active noise cancellation listening mode is activated and the wearable device may select another particular set of spatial audio processing settings associated with transparency listening mode when the transparency listening mode is activated.

The spatial audio processing settings may include, but are not limited to, (i) a status of static/dynamic processing (e.g., whether head-tracking is turned on (activated) or turned off (deactivated)), (ii) virtual acoustic parameters/settings or reverb settings, (iii) head related transfer function (HRTF) sets, (iv) a volume level, (v) virtual sound source position, (vi) virtual sound source emphasis, and (vii) an amount of virtual acoustic parameters (e.g., externalization effects). The virtual acoustic parameters/settings may include one or more presets for different types of environments (e.g., outdoor in nature, commuting, bedroom, living room, cathedral, and other indoor/outdoor environments), a RT60 setting, an absorption coefficient(s), one or more distance models (e.g., inverse square law ($1/r^2$), equal loudness, and custom distance model), or combinations thereof.

A HRTF is a response that characterizes how an ear receives a sound from a point in space. For example, a HRTF(s) can spatialize input audio signals and represent how the human head/shoulders/ears filter sound from different directions in space. In one embodiment, a pair of HRTFs for two ears can be used to synthesize a binaural sound that will be perceived as coming from a particular point in space. In some cases, different HRTF sets (associated with different modifications to input audio signals) can be included within the spatial audio processing settings and dynamically selected by the wearable device.

Note that while the spatial audio processing settings may include a volume level/setting, in general, the volume level/setting may be a parameter used for any listening mode of the wearable device. For example, in one embodiment, the volume level/setting may be frequency dependent. For instance, when the wearable device is in transparency listening mode, a mid-frequency cut may be applied to the media source to reduce masking of real human voices. The virtual sound source position may be a position in various different coordinate systems. In one example, the virtual sound source position is based on a Cartesian coordinate system (e.g., X-Y-Z coordinates). In another example, the virtual sound source position is based on a spherical coordinate system (e.g., azimuth, elevation, and distance). The virtual sound source emphasis may indicate whether to emphasize speech signals, attenuate diffuse ambient sounds, or predetermined in another way.

In certain embodiments, the set of spatial audio processing settings determined (in block 306) may be pre-determined spatial audio processing settings. For example, the wearable device may choose a first set of predetermined spatial audio processing settings associated with active noise cancellation listening mode or choose a second set of predetermined spatial audio processing settings associated with transparency listening mode. The spatial audio processing settings may be predetermined by a user of the wearable device, predetermined by a particular application (e.g., application 270), or predetermined by another component.

In one embodiment, the spatial audio processing settings associated with active noise cancellation listening mode may be selected to create a private setting (e.g., with a degree of isolation from the external environment) for the user. For example, when active noise cancellation listening mode is activated, the wearable device may perform at least one of: (i) disable head-tracking, (ii) adjust (e.g., increase) a volume setting of audio content, (iii) select a set of virtual acoustic settings (e.g., environment type, RT60 setting, absorption coefficient(s), distance models) associated with active noise cancellation listening mode, (iv) decrease a number of virtual acoustic parameters (relative to a number of virtual acoustic parameters used in transparency listening mode), (v) dynamically select a HRTF set(s) used for active noise cancellation listening mode, or (vi) adjust the virtual sound source emphasis (e.g., attenuate diffuse ambient sounds and/or attenuate speech signals).

In one embodiment, the spatial audio processing settings associated with transparency listening mode may be selected to make the user more aware of the external environment. For example, when transparency listening mode is activated, the wearable device may perform at least one of: (i) enable head-tracking, (ii) adjust (e.g., decrease) a volume setting of audio content, (iii) select a set of virtual acoustic settings (e.g., environment type, RT60 setting, absorption coefficient(s), distance models) associated with transparency listening mode, (iv) increase a number of virtual acoustic parameters (relative to a number of virtual acoustic parameters used in active noise cancellation listening mode), (v) dynamically select a HRTF set(s) used for transparency listening mode, or (vi) adjust the virtual sound source emphasis (e.g., emphasize speech signals and/or emphasize diffuse ambient sounds).

At block 308, the wearable device applies the set of spatial audio processing settings while outputting the audio content via transducers (e.g., transducers 240) of the wearable device. The wearable device may apply the set of spatial audio processing settings to a spatial audio rendering algorithm used for generating spatial audio.

Figure 4:
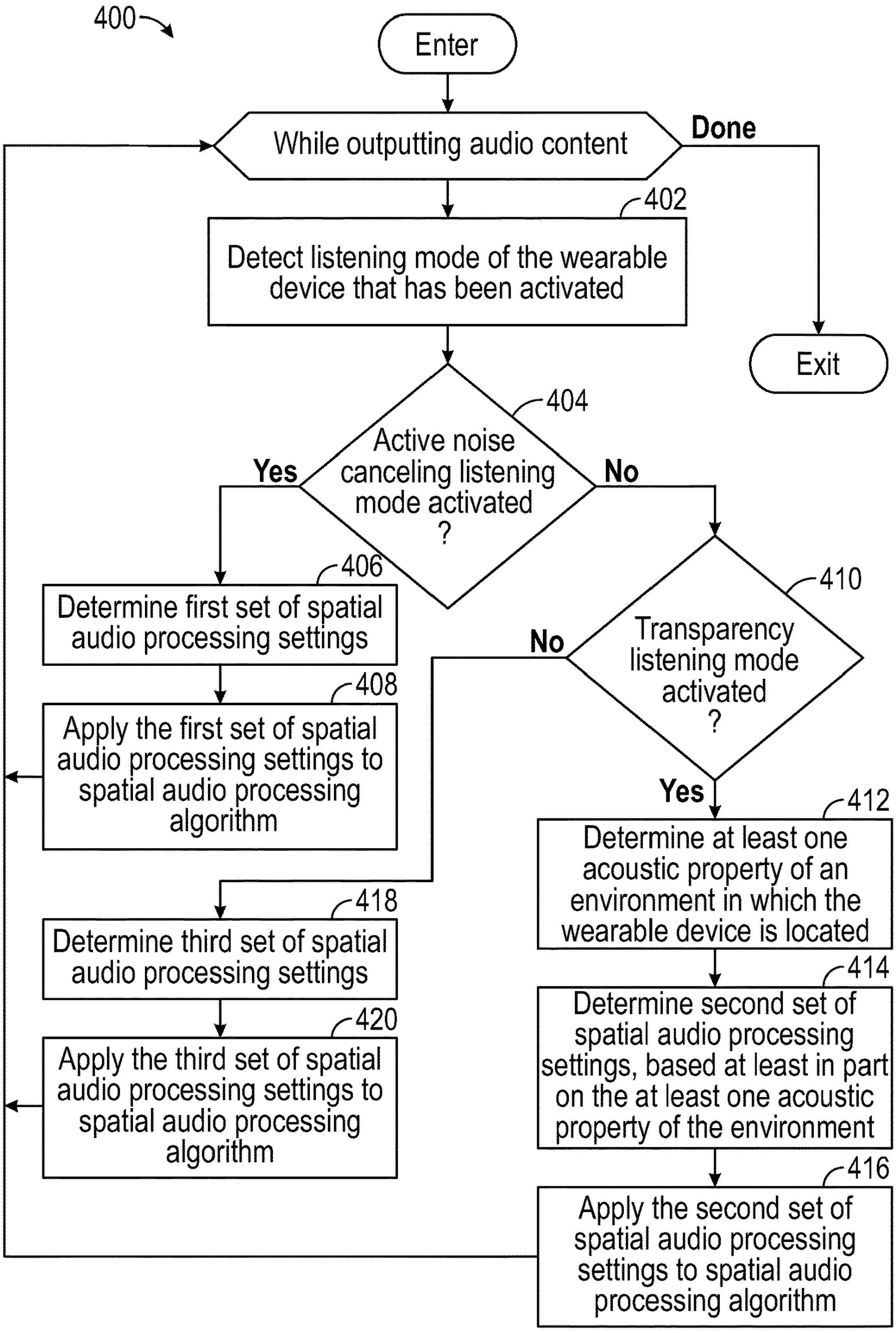
FIG. 4 is a flowchart of another method for performing spatial audio processing based on a listening mode of a wearable device, according to one embodiment.

FIG. 4 is a flowchart of another method 400 for performing spatial audio processing based on a listening mode of a wearable device. The method 400 may be performed by a wearable device (e.g., wearable device 110). For example, at least some of the method 400 may be performed by an adaptive audio component (e.g., adaptive audio component 120) of the wearable device. The method 400 may enter when audio content received from a computing device (e.g., computing device 150) is output by the wearable device.

At block 402, the wearable device detects a listening mode that has been activated. At block 404, the wearable device detects whether the activated listening mode is active noise cancellation listening mode. If the activated listening mode is active noise cancellation listening mode, then the method proceeds to block 406, where the wearable device determines a first set of spatial audio processing settings. At block 408, the wearable device applies the first set of spatial audio processing settings to a spatial audio rendering algorithm.

In one embodiment, the first set of spatial audio processing settings may be a predetermined set of spatial audio processing settings associated with active noise cancellation listening mode. In another embodiment, the first set of spatial audio processing settings may be a predetermined set of spatial audio processing settings associated with active noise cancellation listening mode and a current environment in which the wearable device is located.

In embodiments where the predetermined set of spatial audio processing settings are based at least in part on the current environment, the wearable device may determine the current environment based on an input from the user. For example, the user may use a computing device (e.g., computing device 150) associated with the wearable device to indicate the current environment in which the wearable device is located. Such a computing device may provide an API and/or user interface that allows the user to indicate the particular environment (e.g., workplace, residence, park) in which the wearable device is currently being used to listen to audio content. In another example, the user may provide a direct input to the wearable device to indicate the particular environment in which the wearable device is currently being used to listen to audio content. Alternatively, in certain embodiments, the wearable device may determine the current environment based on one or more acoustic properties of the environment. For example, the wearable device may capture external sounds (or audio signals) using a microphone (e.g., microphone(s) 235) and determine one or more acoustic properties of the environment based on evaluating the external sounds with one or more algorithms. Examples of such acoustic properties can include, for example, RT60 and damping coefficients.

If, at block 404, the activated listening mode is not active noise cancellation listening mode, then the method proceeds to block 410, where the wearable device detects whether the activated listening mode is transparency listening mode. If the activated listening mode is transparency listening mode, then the method proceeds to block 412, where the wearable device determines at least one acoustic property of the environment in which the wearable device is located (e.g., the environment in which the wearable device is being used to listen to audio content). For example, as noted, the wearable device may capture external sounds in the environment using one or more microphones (e.g., microphone(s) 235) of the wearable device and may evaluate the external sounds with one or more algorithms to determine the acoustic properties of the environment (e.g., RT60, damping coefficients).

At block 414, the wearable device determines a second set of spatial audio processing settings, based at least in part on the at least one acoustic property of the environment. For example, the wearable device may determine at least one of a volume setting or amount of virtual acoustic parameters to use for spatial audio processing based on the current acoustic properties of the environment. At block 416, the wearable device applies the second set of spatial audio processing settings to a spatial audio rendering algorithm.

If, at block 410, the activated listening mode is not transparency listening mode, then the method 400 proceeds to block 418, where the wearable device determines a third set of spatial audio processing settings. At block 420, the wearable device applies the third set of spatial audio processing settings to a spatial audio rendering algorithm. In one embodiment, the third set of spatial audio processing settings may be a predetermined set of spatial audio processing settings associated with passive listening mode.

Figure 5A:
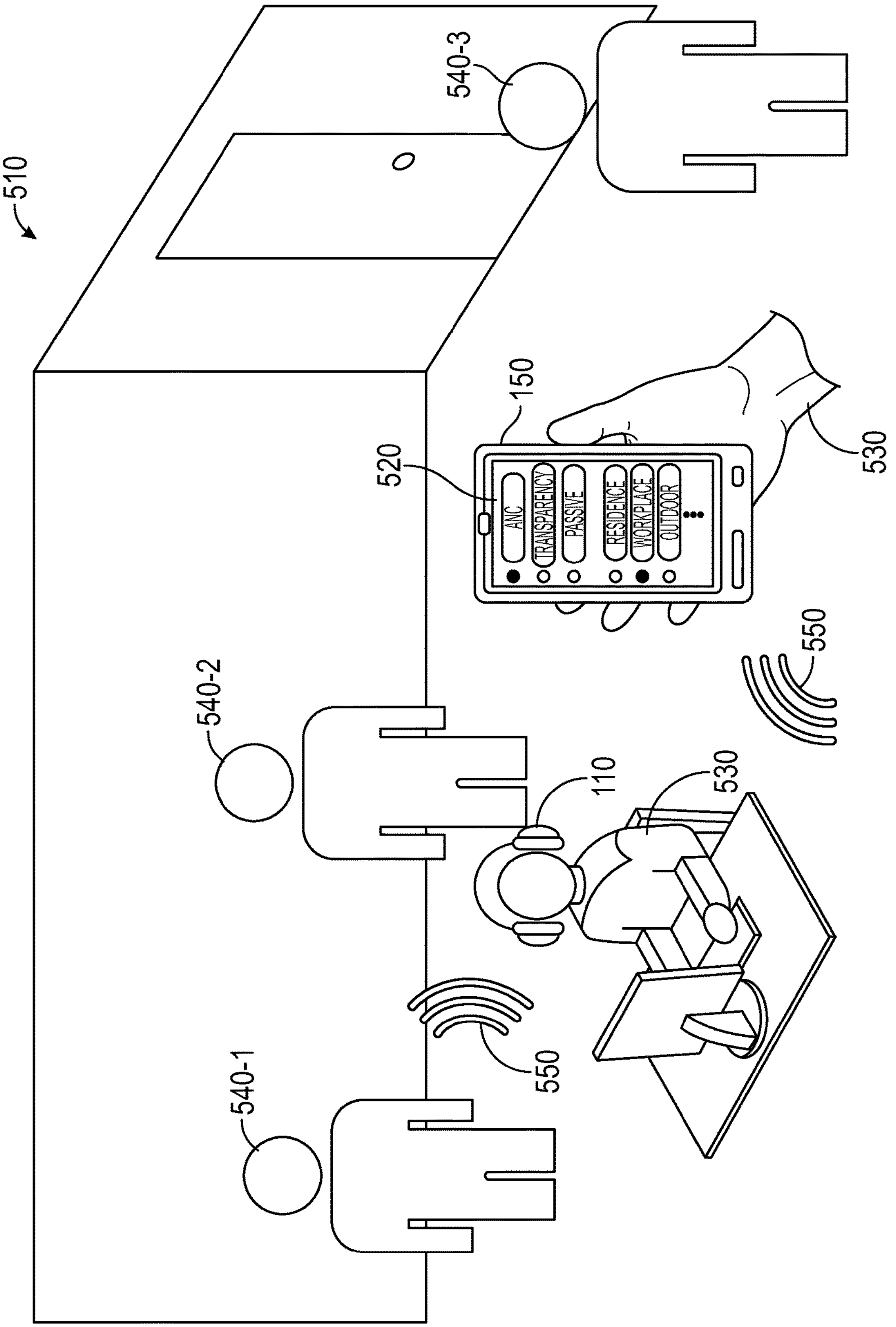
FIGS. 5A-5C illustrate example scenarios in which spatial audio processing is performed based on a listening mode of a wearable device, according to one embodiment.
Figure 5B:
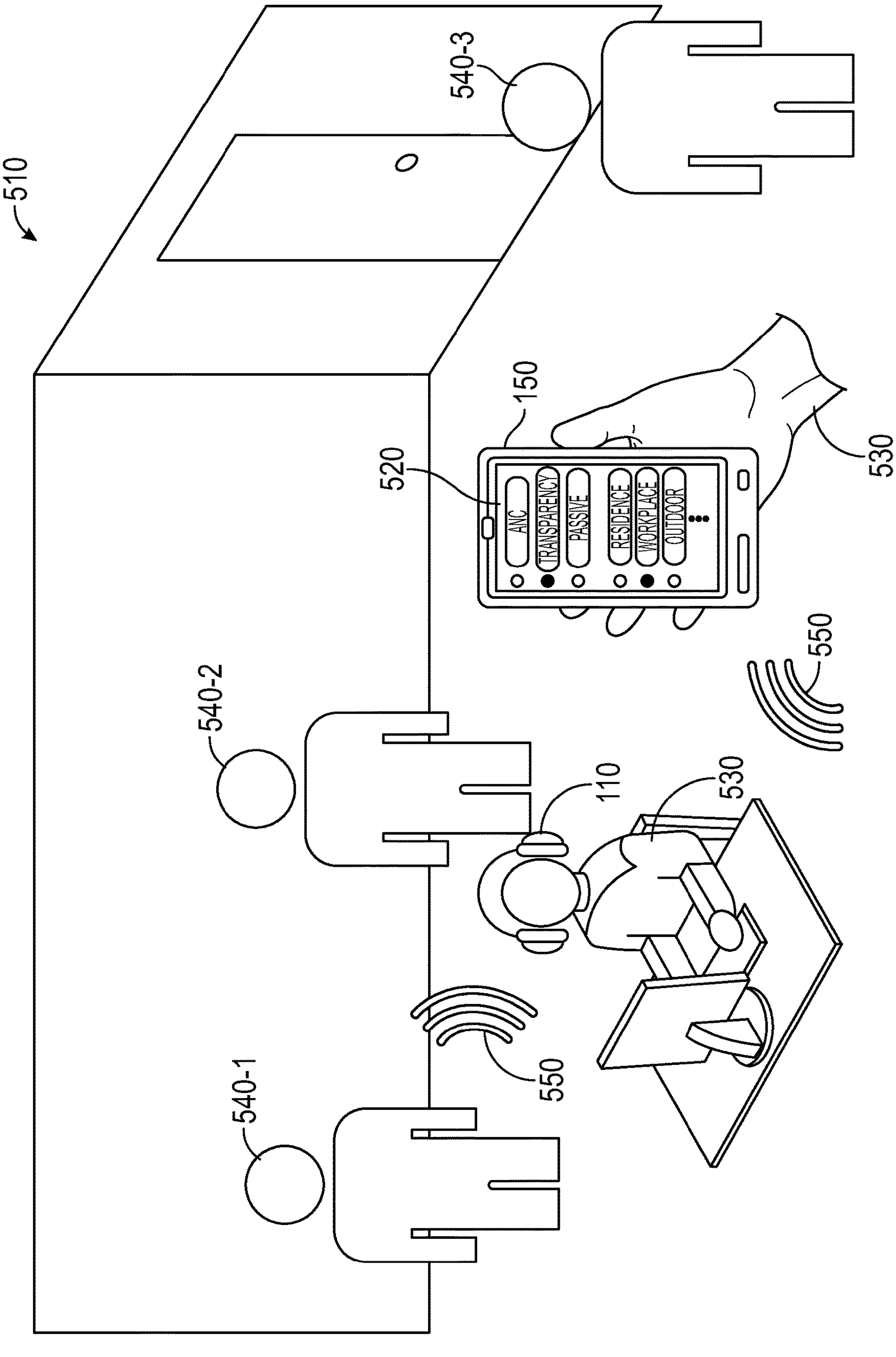
Figure 5C:
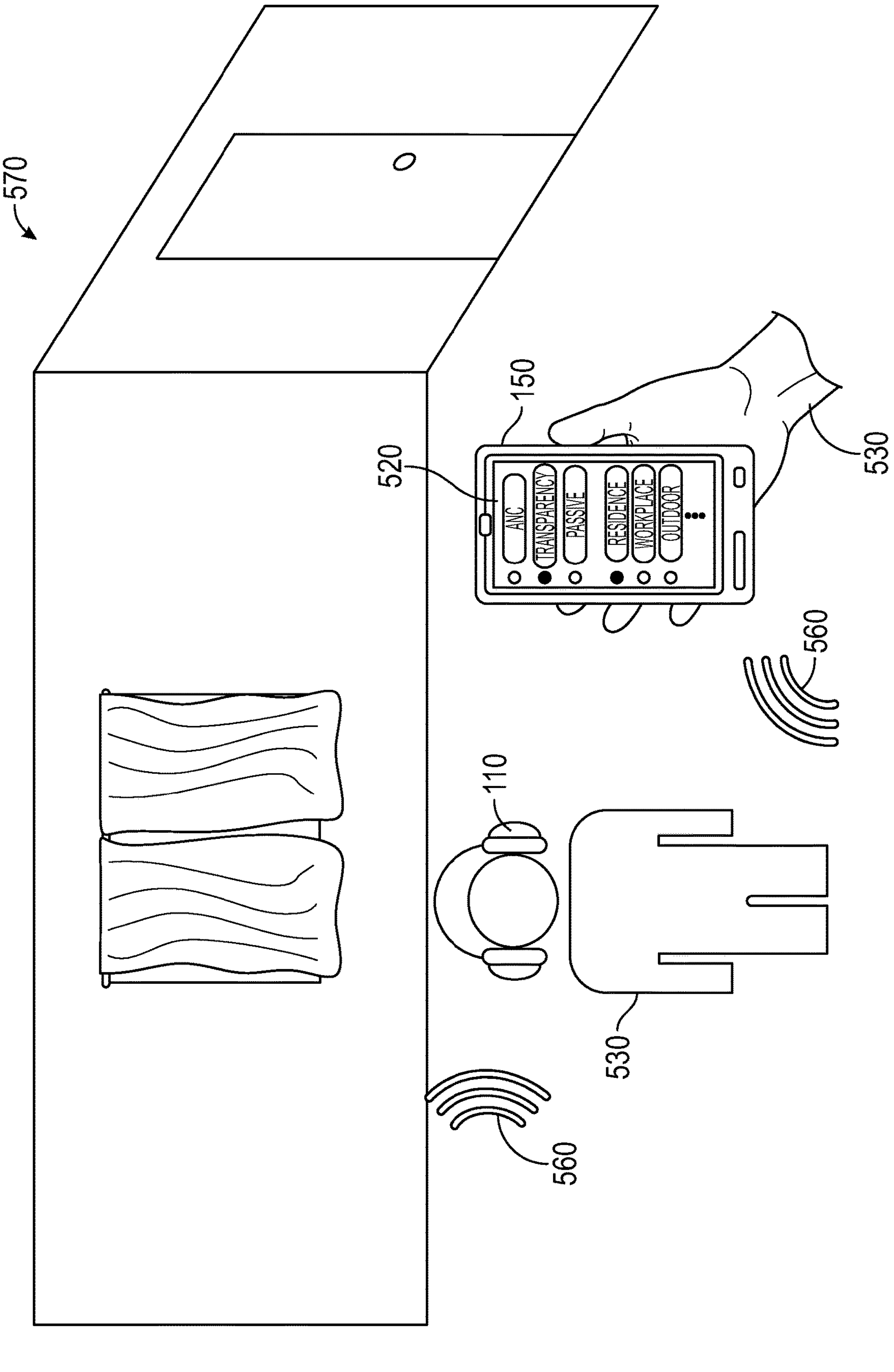

FIGS. 5A-5C illustrate different scenarios in which spatial audio processing is performed based in part on a listening mode of a wearable device, according to one embodiment. As shown in FIG. 5A, a user 530 may use a wearable device 110 to listen to audio content from a computing device 150 in the environment 510, such as the user's workplace. In some instances, the environment 510 may be a noisy environment due to, for example, several people (e.g., persons 540 1-3) performing various activities within environment 510. In such a noisy environment, the user 530 may be exposed to external sounds 550 that can distract or disrupt the user from working and/or distract or disrupt the user's listening experience. In such instances, the user 530 may activate noise canceling listening mode for the wearable device in order to reduce at least some of the external sounds 550 interfering with the listening experience of the user 530. Here, for example, the user 530 selects a prompt for active noise cancellation listening mode on a user interface 520 of the computing device 150 in order to activate the active noise cancellation listening mode on the wearable device 110.

In response to detecting that active noise cancellation listening mode has been activated, the wearable device 110 may automatically perform spatial audio processing based at least in part on the activated active noise cancellation listening mode. For example, as noted above, the wearable device 110 may determine a set of spatial audio processing settings associated with active noise cancellation listening mode and may apply the set of spatial audio processing settings to a spatial audio rendering algorithm while outputting audio content. The application of such set of spatial audio processing settings may create or simulate a private setting for the user within the environment 510, such that the user 530 perceives that they are isolated from the external sounds 550 within the environment 510.

In some embodiments, the set of spatial audio processing settings are a predefined set of spatial audio processing settings associated with at least one of (i) active noise cancellation listening mode or (ii) a type of environment in which the wearable device 110 is located or being used to listen to audio content from the computing device 150. As shown in FIG. 5A, in one embodiment, the user 530 may provide an indication of the type of environment via the user interface 520 of the computing device. Here, for example, the user 530 may select a prompt for "workplace" out of one or more different prompts for different types of environments.

Note, however, that a user indicating the type of environment is one example of how the wearable device 110 can determine the type of environment and that the wearable device 110 can determine the type of environment using other techniques consistent with the functionality described herein. For example, in some embodiments, the wearable device 110 may monitor and evaluate external sounds 550 with one or more algorithms to determine one or more acoustic properties of the environment 510, and may determine the type of environment based on the acoustic properties. For instance, the wearable device 110 may determine whether the environment 510 is an indoor environment, outdoor environment, or other environment type, based on the acoustic properties. The wearable device 110 may then select a set of predefined spatial audio processing settings associated with active noise cancellation listening mode and the determined type of environment.

As shown in FIG. 5B, at a subsequent point in time to activating active noise cancellation listening mode, the user 530 may switch to listening to the audio content from the computing device 150 in transparency listening mode within the environment 510. For example, the user 530 may select a prompt for transparency listening mode on the user interface 520 of the computing device 150. In some instances, the user 530 may switch from active noise cancellation listening mode to transparency listening mode in order to perceive at least some of the external sounds 550 within the environment 510 while also listening to audio content from the computing device 150. For example, the user 530 may wish to interact with another person (e.g., person(s) 540 1-3) within the environment 510, may want to hear dialogue within the environment 510, or engage in other types of interactions.

When the wearable device 110 detects that transparency listening mode has been activated, the wearable device 110 may adapt the spatial audio processing based at least in part on the transparency listening mode. For example; the wearable device 110 may determine a set of spatial audio processing settings associated with transparency listening mode and may apply the set of spatial audio processing settings associated with transparency listening mode to a spatial audio rendering algorithm while outputting the audio content received from the computing device 150. The application of such set of spatial audio processing settings may create or simulate a more immersive setting for the user within the environment 510, such that the user 530 is able to perceive certain external sounds (e.g., voice) within the environment 510 while listening to the audio content.

In some embodiments, the wearable device 110 may select a predefined set of spatial audio processing settings associated with transparency listening mode. In other embodiments, the wearable device 110 may dynamically determine and update the spatial audio processing settings based on current acoustic properties of the environment 510. As noted above, for example, the wearable device 110 may determine acoustic properties of the environment 510 based on an evaluation of external sounds captured via a microphone of the wearable device 110 with one or more algorithms.

As shown in FIG. 5C, at a subsequent point in time to activating active noise cancellation listening mode (FIG. 5A) or transparency listening mode (FIG. 5B), the user 530 may enter an environment 570, such as the user's 530 residence. Here, the user 530 may choose to listen to audio content using the wearable device 110 in transparency listening mode in order to be able to perceive certain external sounds 560 within the environment 570. As shown, for example, the user 530 selects a prompt for transparency listening mode on the user interface 520 of the computing device 150.

As noted, in some embodiments, the spatial audio processing settings associated with transparency listening mode may be a predetermined set of spatial audio processing settings associated with at least one of (i) transparency listening mode or (ii) a type of environment in which the wearable device 110 is located. In one example, the user 530 may indicate the type of environment via the computing device 150. Here, for example, the user 530 can select a prompt for "residence" to indicate the type of environment.

As also noted, in some embodiments, the spatial audio processing settings associated with transparency listening mode may be dynamically determined/updated based on current acoustic properties in the environment 570. For example, the wearable device 110 may evaluate the external sounds 560 with one or more algorithms to determine the acoustic properties of the environment 570.

Advantageously, embodiments described herein can significantly improve spatial audio processing by automatically adapting the spatial audio processing based on a currently activated listening mode of a wearable device. In doing so, a more coherent and ecologically congruent auditory experience can be achieved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in “the cloud,” without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data (e.g., application(s) 270) available in the cloud. For example, the computing device 150 may access audio content from applications in the cloud and may send the audio content to the user via the wearable device 110. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for performing spatial audio processing based on a listening mode of a wearable device, the computer-implemented method comprising:

detecting, at a first point in time and from a plurality of listening modes, a first listening mode that is activated at the first point in time on the wearable device;

determining a first set of spatial audio processing settings based on the first listening mode; and applying the first set of spatial audio processing settings to a spatial audio rendering algorithm while outputting audio content from the wearable device.

2. The computer-implemented method of claim 1, wherein the plurality of listening modes comprise an active noise cancellation listening mode, a transparency listening mode, and a passive listening mode.

3. The computer-implemented method of claim 1, wherein determining the first set of spatial audio processing settings comprises selecting, as the first set of spatial audio processing settings, a predefined set of spatial audio settings associated with the first listening mode.

4. The computer-implemented method of claim 1, wherein determining the first set of spatial audio processing settings comprises selecting, as the first set of spatial audio processing settings, a predefined set of spatial audio settings associated with the first listening mode and an environment in which the wearable device is located at the first point in time.

5. The computer-implemented method of claim 4, further comprising receiving an indication of the environment from a user of the wearable device.

6. The computer-implemented method of claim 4, further comprising determining the environment based at least in part on one or more acoustic properties of the environment.

7. The computer-implemented method of claim 1, wherein determining the first set of spatial audio processing settings comprises:

determining one or more first acoustic properties of an environment in which the wearable device is located at the first point in time; and determining the first set of spatial audio processing settings further based on the one or more first acoustic properties of the environment.

8. The computer-implemented method of claim 7, further comprising determining a second set of spatial audio processing settings at a second point in time subsequent to the first point in time, comprising:

determining one or more second acoustic properties of an environment in which the wearable device is located at the second point in time; and determining the second set of spatial audio processing settings further based on the one or more second acoustic properties of the environment, wherein the first set of spatial audio processing settings is different from the second set of spatial audio processing settings.

9. The computer-implemented method of claim 1, further comprising:

detecting, at a second point in time and from the plurality of listening modes, a second listening mode that is activated at the second point in time on the wearable device;

determining a second set of spatial audio processing settings based on the second listening mode; and applying the second set of spatial audio processing settings to a spatial audio rendering algorithm while outputting the audio content, wherein the first listening mode is different from the second listening mode and wherein the first set of spatial audio processing settings is different than the second set of spatial audio processing settings.

10. The computer-implemented method of claim 9, wherein:

the first listening mode is active noise cancellation listening mode; and the second listening mode is transparency listening mode.

11. The computer-implemented method of claim 10, wherein:

the first set of spatial audio processing settings comprises a first volume setting; and the second set of spatial audio processing settings comprises a second volume setting lower than the first volume setting.

12. The computer-implemented method of claim 10, wherein:

the first set of spatial audio processing settings comprises a deactivated head-tracking mode; and the second set of spatial audio processing settings comprises an activated head-tracking mode.

13. The computer-implemented method of claim 10, wherein:

the first set of spatial audio processing settings comprises a first amount of virtual acoustic parameters applied to the spatial audio rendering algorithm; and the second set of spatial audio processing settings comprises a second amount of virtual acoustic parameters, different to the first amount of virtual acoustic parameters, applied to the spatial audio rendering algorithm.

14. A computer-implemented method comprising:

detecting a listening mode of a wearable device that has been activated for listening to audio content; and activating or deactivating a head-tracking mode of the wearable device based on the listening mode.

15. The computer-implemented method of claim 14, wherein activating or deactivating the head-tracking mode comprises deactivating the head-tracking mode when the listening mode is an active noise cancellation listening mode.

16. The computer-implemented method of claim 14, wherein activating or deactivating the head-tracking mode comprises activating the head-tracking mode when the listening mode is a transparency listening mode.

17. A wearable device comprising:

a processor, and a memory storing instructions, which, when executed on the processor perform an operation for spatial audio processing based on a listening mode of the wearable device, the operation comprising:

detecting, at a point in time and from a plurality of listening modes, a listening mode that is activated at the point in time on the wearable device;

determining a set of spatial audio processing settings based on the listening mode; and applying the set of spatial audio processing settings to a spatial audio rendering algorithm while outputting audio content.

18. The wearable device of claim 17, wherein determining the set of spatial audio processing settings comprises selecting, as the set of spatial audio processing settings, a predefined set of spatial audio settings associated with the listening mode.

19. The wearable device of claim 17, wherein determining the set of spatial audio processing settings comprises selecting, as the set of spatial audio processing settings, a predefined set of spatial audio settings associated with the listening mode and an environment in which the wearable device is located at the point in time.

20. The wearable device of claim 17, wherein determining the set of spatial audio processing settings comprises:

determining one or more acoustic properties of an environment in which the wearable device is located at the point in time; and determining the set of spatial audio processing settings further based on the one or more acoustic properties of the environment.

* * * * *